US010702982B2

(12) United States Patent
Tsai (10) Patent No.: US 10,702,982 B2
(45) Date of Patent: Jul. 7, 2020

(54) FOLDABLE TOOL KIT WITH TIRE REPARATION FUNCTION

(71) Applicant: U-POWER COLLECTION ENTERPRISE CO., LTD., Taichung (TW)

(72) Inventor: Perry Tsai, Taichung (TW)

(73) Assignee: U-POWER COLLECTION ENTERPRISE CO., LTD., Taichung (TW)

( * ) Notice: Subject to any disclaimer, the term of this patent is extended or adjusted under 35 U.S.C. 154(b) by 202 days.

(21) Appl. No.: 16/034,204

(22) Filed: Jul. 12, 2018

(65) Prior Publication Data

US 2019/0077002 A1    Mar. 14, 2019

(30) Foreign Application Priority Data

Sep. 12, 2017  (TW) .............................. 106131296 A (51) Int. Cl.
| B25F 1/04 | (2006.01) |
| B25B 27/00 | (2006.01) |
| B26B 11/00 | (2006.01) |
| B21L 21/00 | (2006.01) |
| B24B 23/00 | (2006.01) |
| B67B 7/16 | (2006.01) |
| B25F 5/00 | (2006.01) |
| B29C 73/12 | (2006.01) |
| B25B 15/00 | (2006.01) |
| B25B 13/50 | (2006.01) |

(52) U.S. Cl.
CPC ................ *B25F 1/04* (2013.01); *B21L 21/00* (2013.01); *B24B 23/00* (2013.01); *B25B 27/0071* (2013.01); *B25F 5/001* (2013.01); *B26B 11/001* (2013.01); *B25B 13/50* (2013.01); *B25B 15/005* (2013.01); *B25B 15/007* (2013.01); *B25B 15/008* (2013.01); *B29C 73/12* (2013.01); *B67B 7/16* (2013.01)

(58) Field of Classification Search
CPC ........ B25F 1/04; B25F 5/001; B25B 27/0071; B21L 21/00; B24B 23/00; B26B 11/001
USPC ......................................................... 81/15.2
See application file for complete search history.

(56) References Cited

U.S. PATENT DOCUMENTS

| 6,751,819 | B2 * | 6/2004 | Chuang | .................. B25B 13/56 |
| | | | | 157/1.3 |
| 7,047,847 | B2 * | 5/2006 | Chuang | .................. B25B 13/56 |
| | | | | 7/138 |
| 9,457,460 | B2 * | 10/2016 | Hermansen | ............... B25F 1/02 |
| 9,855,652 | B2 * | 1/2018 | Chen | ...................... B25G 1/085 |
| 10,408,301 | B2 * | 9/2019 | Lauer | .................. B25B 27/0071 |
| 2012/0255273 | A1 * | 10/2012 | Wang | ........................ B25F 1/04 |
| | | | | 59/7 |
| 2016/0279696 | A1 * | 9/2016 | Chen | ...................... B21L 21/00 |

(Continued)

*Primary Examiner* — David B. Thomas
(74) *Attorney, Agent, or Firm* — Guice Patents PLLC (57) ABSTRACT

A foldable tool kit includes: a main body having a first side board and a second side board spaced from each other; multiple tools including a grinding tool, a chuck and a blade, one end of the tools being pivotally connected with at least one end of the main body and rotatable; the other end of the chuck having a chuck section; a grinding section being disposed on the grinding tool; and at least one tire reparation member received in one of the side boards. In case that a tire is punctured, the foldable tool kit can be used to repair the tire.

20 Claims, 7 Drawing Sheets

(56) References Cited

U.S. PATENT DOCUMENTS

2018/0104803 A1\* 4/2018 Chuang ................. B25G 1/085
2019/0061126 A1\* 2/2019 Park ....................... B25B 13/48

\* cited by examiner

FOLDABLE TOOL KIT WITH TIRE REPARATION FUNCTION

BACKGROUND OF THE INVENTION

1. Field of the Invention

The present invention relates generally to a hand tool used for a bicycle, and more particularly to a foldable tool kit serving to repair the tire of the bicycle.

2. Description of the Related Art

It is known that bicycle riding is no more simply for transportation, but for environmental protection and excise. A foldable tool kit can be conveniently carried by a bicycle rider for simple service of the bicycle. Therefore, a bicycle rider often carries a foldable tool kit with him/her as a service tool kit.

Recently, it has become a trend to ride a bicycle for island cycling. Also, many bicycle riders are fond of conquering maintain roads. However, when riding a bicycle, the tire of the bicycle may be punctured and broken due to severe road condition or potential problem of the tire. In case the puncture of the tire takes place in a deserted district, it will be hard to get any rescue immediately. The conventional bicycle foldable tool kit can be used to repair the bicycle, however, with respect to the most often happening situation of flat tire or puncture of the tire, the conventional bicycle foldable tool kit is not specifically designed for tire reparation.

It is therefore tried by the applicant to provide a foldable tool kit with full tire reparation function so as to enhance the diversity and convenience of the bicycle tool kit.

SUMMARY OF THE INVENTION

It is therefore an object of the present invention to provide a foldable tool kit with tire reparation function, which enables a user to repair the tire of the bicycle himself/herself.

To achieve the above and other objects, the foldable tool kit with tire reparation function of the present invention includes:

a main body having a first side board and a second side board spaced from each other, the two side boards defining therebetween a receiving space, a first chamber being formed in the first side board;

multiple tools including a grinding tool, a chuck and a blade, one end of the tools being pivotally connected with at least one end of the main body and rotatable into the receiving space or out of the receiving space;

the other end of the chuck having a chuck section;

a grinding section being disposed on the grinding tool; and at least one tire reparation member received in the first chamber.

Still to achieve the above and other objects, the foldable tool kit with tire reparation function of the present invention includes:

a main body having a first side board and a second side board spaced from each other, the two side boards defining therebetween a receiving space, a second chamber being formed in the second side board;

multiple tools including a grinding tool, a chuck and a blade, one end of the tools being pivotally connected with at least one end of the main body and rotatable into the receiving space or out of the receiving space;

the other end of the chuck having a chuck section;

a grinding section being disposed on the grinding tool; at least one tire reparation member received in the main body; and at least one bicycle component received in the second chamber.

In the above foldable tool kit, the grinding tool has the form of a rod and the grinding section is disposed on a circumference of the grinding tool.

In the above foldable tool kit, the chuck section of the chuck has two chucking plates spaced from each other.

In the above foldable tool kit, the tire reparation member is a tire reparation strip or a tire reparation patch.

In the above foldable tool kit, the bicycle component is a chain connector located in the second chamber.

In the above foldable tool kit, the multiple tools further include at least one foldable tool, one end of the foldable tool is pivotally connected with the main body and rotatable, the other end of the foldable tool is an operation end, the operation end can have the form of a flat-head screwdriver head, a cross-head screwdriver head or a hexagonal wrench head.

According to the above, no matter whether the bicycle tire has an inner tire or not, in case the tire of the bicycle is punctured, the rider can easily use the chuck, the grinding tool, the blade and the tire reparation member to repair and recover the tire. In the foldable tool kit of the present invention, all the possibly necessary tools for tire reparation are integrated into the foldable tool kit. In addition, the tire reparation member is received in the first receiving space for the bicycle rider to conveniently carry with missing. Accordingly, the diversity and convenience of the foldable tool kit can be enhanced.

The present invention can be best understood through the following description and accompanying drawings, wherein:

DETAILED DESCRIPTION OF THE PREFERRED EMBODIMENTS

Please refer to FIGS. 1 to 4. According to a first embodiment, the foldable tool kit 10 of the present invention mainly includes a main body 20, multiple tools, at least one tire reparation member 90 and at least one bicycle component. The tools include a chuck 30, a grinding tool 40, a blade 50 and at least one foldable tool 60. In this embodiment, the bicycle component is a chain connector 100.

Figure 5:
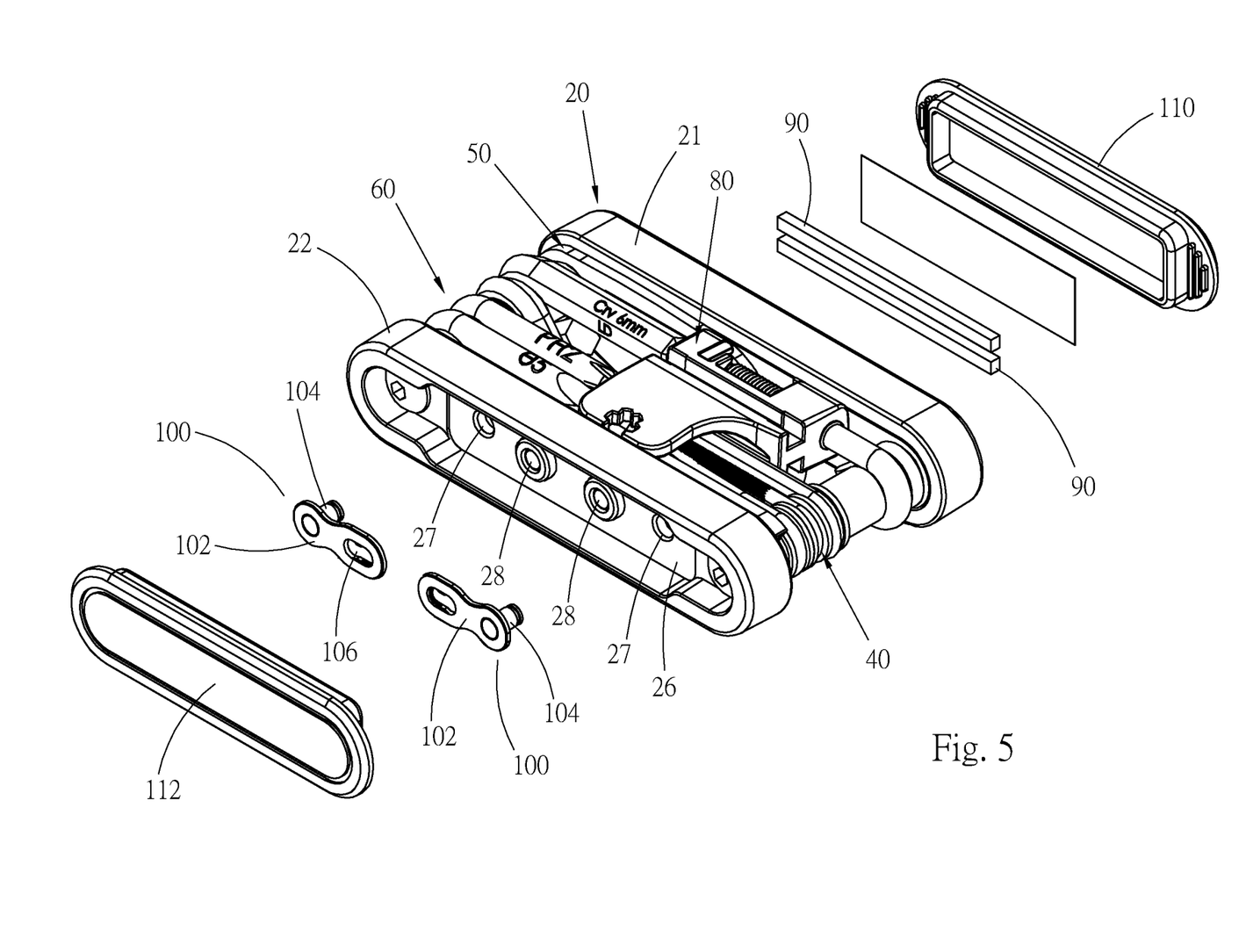
FIG. 5 is substantially identical to FIG. 1, showing that the two outer covers are opened.
Figure 6:
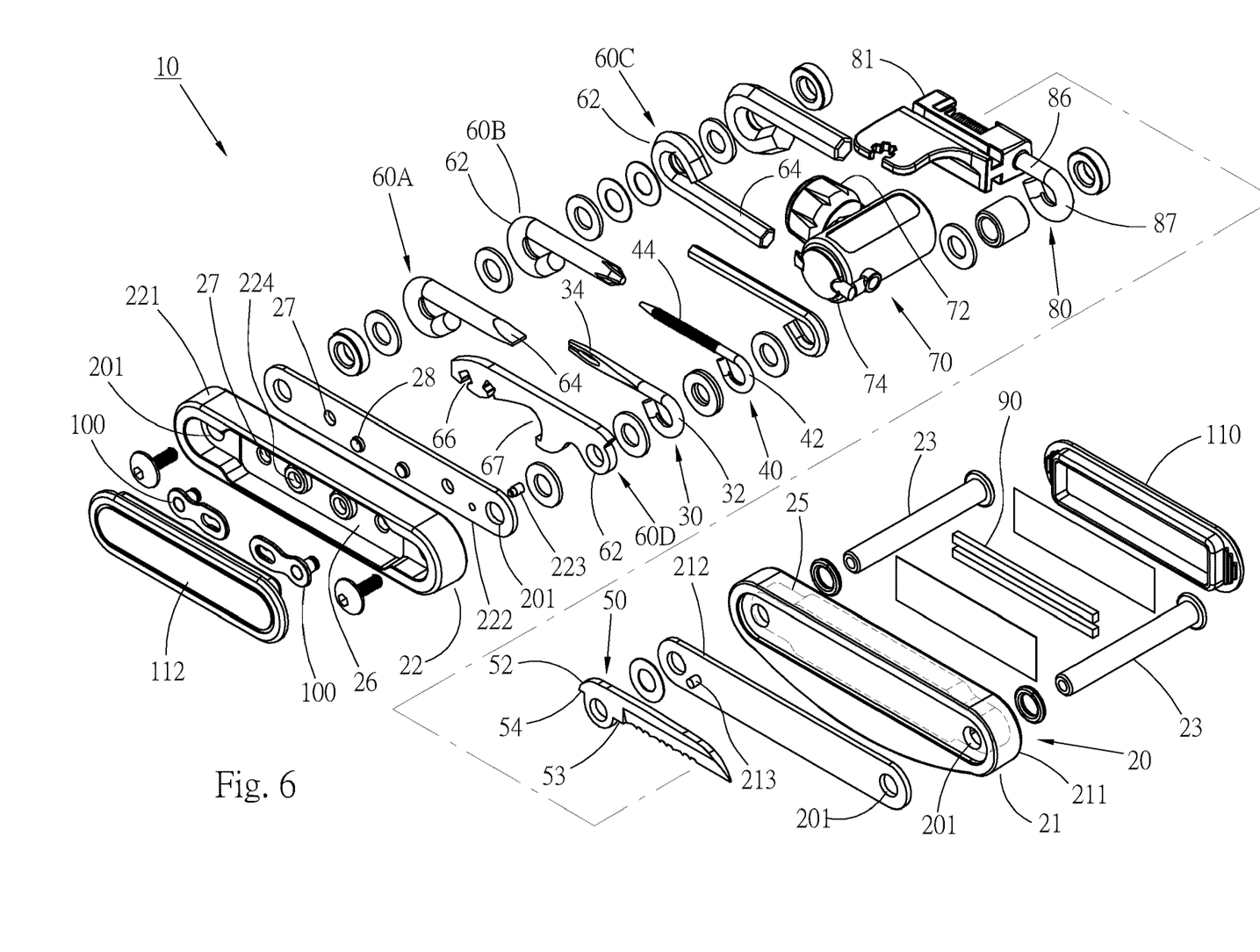
FIG. 6 is a perspective exploded view of the foldable tool kit of the present invention according to FIG. 1.

Please now refer to FIGS. 5 and 6. The main body 20 can be made with various configurations, for example, the main body 20 has, but not limited to, a U-shaped or an H-shaped configuration. The main body 20 has a first side board 21 and a second side board 22 side-by-side arranged at an interval. Two shaft rods 23 are respectively passed through the pivot holes 201 formed at two ends of the two side boards 21, 22 to connect the two side boards with each other. The two side boards define therebetween a receiving space 24. The structure of the two side boards connected by the shaft rods is not the feature of the present invention and thus will not be further described hereinafter. An outer wall face of the first side board 21 is inward recessed to forma first chamber 25. An outer wall face of the second side board 22 is inward recessed to form a second chamber 26. Two insertion holes 27 and two latch bosses 28 are disposed on the inner wall of the second chamber 26 as shown in FIG. 5. Please now refer to FIGS. 6 and 9, in this embodiment, the first side board 21 has a first case 211 and a first plate body 212, the plate body 212 has a rigidity and hardness greater than those of the case 211 and is disposed on the inner wall face of the case 211. The first chamber 25 is disposed on the outer wall face of the case 211.

Please now refer to FIGS. 5 and 6, the second side board 22 in this embodiment also has a second case 221 and a second plate body 222. The second plate body 222 is disposed on the inner wall face of the second case 221 and has a hardness and rigidity greater than those of the case 221. The second chamber 26 is disposed on the outer wall face of the case 221. The two insertion holes 27 are formed through both the case 221 and the plate body 222. The two latch bosses 28 are securely disposed on the plate body 222. One end of the latch bosses 28 protrudes through the perforations 224 of the case 221 into the second chamber 26.

Figure 4:
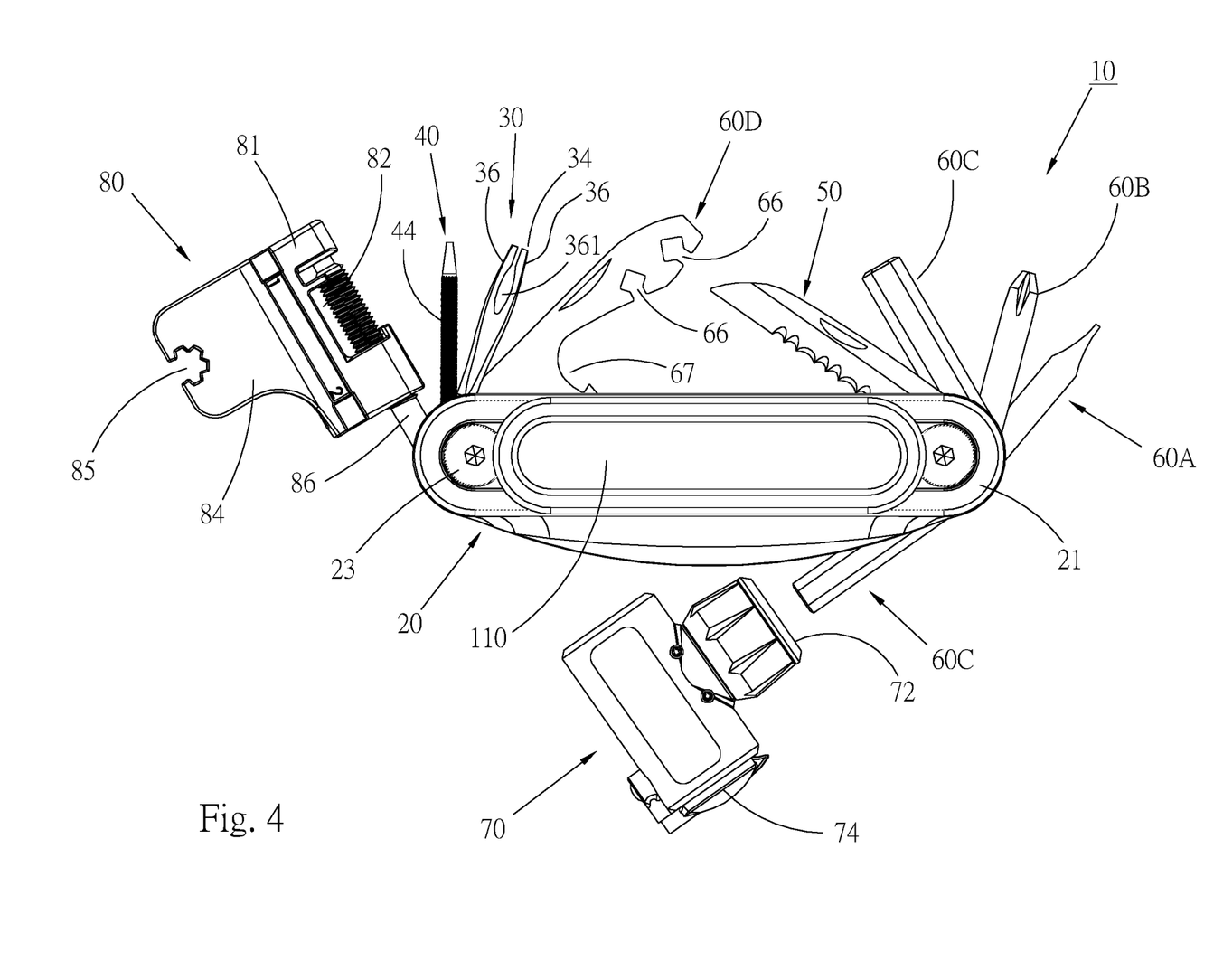
FIG. 4 is a left view of the foldable tool kit, showing that the tools of the tool kit are folded outward.

Please now refer to FIGS. 4 and 6, in this embodiment, the chuck 30 is a tire reparation chuck. One end of the chuck 30 is a pivoted end 32 pivotally disposed on a shaft rod 23 disposed at one end of the main body 20, whereby the chuck 30 can be rotated around the shaft rod 23 as a center to be received in the receiving space 24 of the main body 20 or outward folded for use. The other end of the chuck 30 has a chuck section 34 having two chucking plates 36 spaced from each other. The two chucking plates 36 can be elastically expanded to hold the tire reparation member. A chucking split 361 is defined between the two chucking plates 36. As shown in FIG. 4, an inner end of the chucking split 361 has a larger width, while an outer end of the chucking split 361 has a smaller width.

In this embodiment, the grinding tool 40 has the form of a rod or a bar, one end of the grinding tool 40 is a pivoted end 42 pivotally disposed on a shaft rod 23 disposed at one end of the main body 20, whereby the grinding tool 40 can be rotated to be received in the receiving space 24 of the main body 20 or outward folded for use. A grinding section 44 is disposed on the grinding tool 40, for example, disposed at one end of the tool 40 or disposed on the circumference of the tool 40. In this embodiment, the grinding section is a rough annular face disposed on the circumference of the tool 40.

Figure 9:
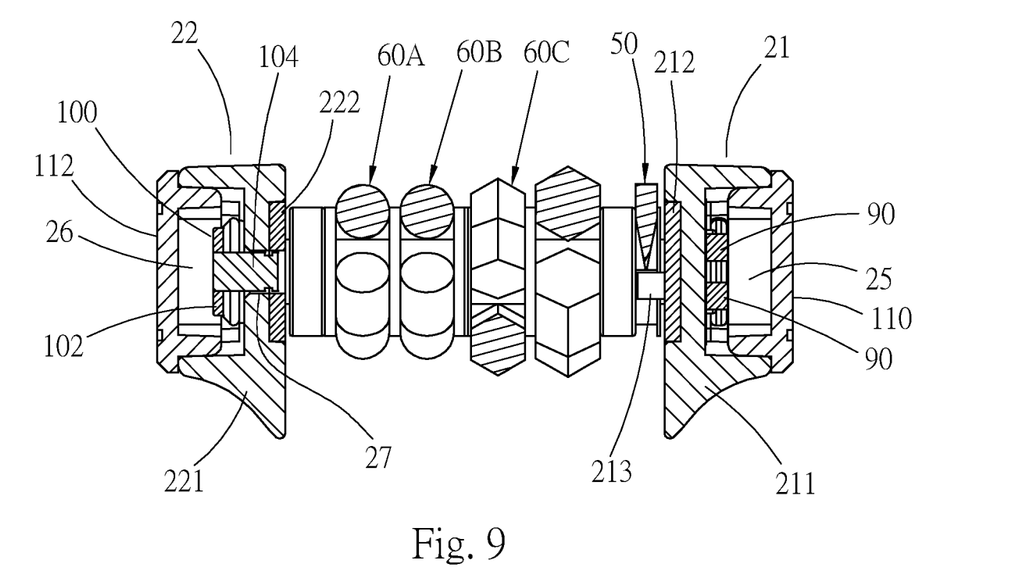
FIG. 9 is a sectional view taken along line 9-9 of FIG. 1.

The blade 50 also has a pivoted end 52 pivotally disposed on a shaft rod 23 and rotatable. When it is desired to use the blade 50, the blade 50 is outward rotated. After used, the blade 50 is rotated into the main body 20 and received in the receiving space 24. In this embodiment, the arrangement position of the blade 50 is in adjacency to one of the side boards (such as the first side board 21). A restriction section 213 protrudes from the inner wall face of the side board as shown in FIGS. 6 and 9. Stop sections 53, 54 are disposed at the pivoted end 52 of the blade 50. Accordingly, when the blade 50 is received in the receiving space 24 or outward folded, the restriction section 213 serves to stop and locate the blade 50 so as to enhance the security of the tool kit 10.

In addition to the above tools, this embodiment further includes one or more foldable tools 60 (the foldable tool is generally denoted with reference numeral 60), for example, this embodiment includes a flat-head tool 60A, a cross-head tool 60B, three hexagonal wrenches 60C with different sizes and a complex tool 60D. One end of the foldable tools 60 is a pivoted end 62 respectively disposed on a shaft rod 23 and rotatable. The other end of the tools 60A, 60B and 60C is an operation end 64 with a specific configuration such as a flat-head screwdriver head, a cross-head screwdriver head and a hexagonal wrench head. The configuration (such as the screwdriver-form tool and wrench-form tool) and the number of the foldable tools of this embodiment are only for illustration purposes and not intended to limit the scope of the present invention.

In this embodiment, the complex tool 60D is a spoke adjustment tool. The body of the complex tool 60D is formed with two spoke fitting notches 66 with different sizes and a bottle opening mouth 67. The two spoke fitting notches 66 have different widths for adjusting the spokes of the bicycle. The bottle opening mouth 67 is used to open a bottle cap. As shown in FIG. 6, a second restriction section 223 is disposed on the inner wall face of one of the side boards (such as the second side board 22). When the tool 60D is received in the receiving space 24 or folded out, the second restriction section 223 serves to stop and locate the tool 60D.

The foldable tool kit 10 of the present invention further includes a valve connector 70 and a chain breaker tool 80. The valve connector 70 has a first valve adaptation section 72 and a second valve adaptation section 74. The two valve adaptation sections have the form of a fitting hole. The second valve adaptation section 74 can be fitted and connected with a high-pressure air steel cylinder. The first valve adaptation section 72 can be fitted and connected with a valve of a tire, whereby the air in the steel cylinder can flow into the tire to inflate the tire. When received, the first valve adaptation section 72 of the valve connector 70 is fitted and connected with the free end of any of the aforesaid tools. In this embodiment, the valve connector 70 is fitted and connected with the operation end of a hexagonal wrench head 60C and received in the main body 20, whereby the valve connector 70 can be carried and used with the tool kit 10.

The chain breaker tool 80 includes a chain breaker main body 81 and a push rod 86. The push rod 86 is screwed in a threaded hole formed on one side of the chain breaker main body 81 and can be screwed into or out of a chain breaking space 82 at one end of the main body 81. The chain breaking space 82 is for a chain to place in and pertains to prior art and thus will not be further described hereinafter. A holding section 84 outward extends from the main body 81 for a user to hold. A mavic wrench 85 with a special configuration is disposed on the holding section 84 for rotating the spoke or a specific section. A pivoted section 87 is disposed at one end of the push rod 86 for pivotally connecting the chain breaker tool 80 with a shaft rod 23, whereby the tool 80 also becomes a foldable tool, which can be inward rotated and received in the receiving space 24 or outward folded for use.

Figure 8:
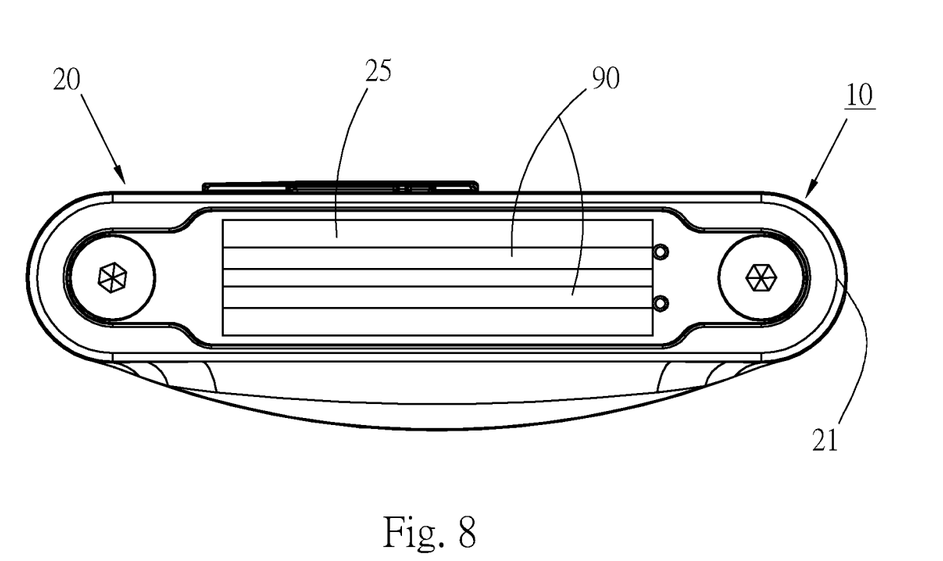
FIG. 8 is a right view according to FIG. 1, showing that the tire reparation members are received in the foldable tool kit.

Please now refer to FIGS. 5 and 8. In this embodiment, there are two tire reparation members 90, which are tire reparation strips for a user to fill the puncture of the tire and repair the broken tire. The two tire reparation members 90 are received in the first chamber 25 of the first side board 21.

Figure 7:
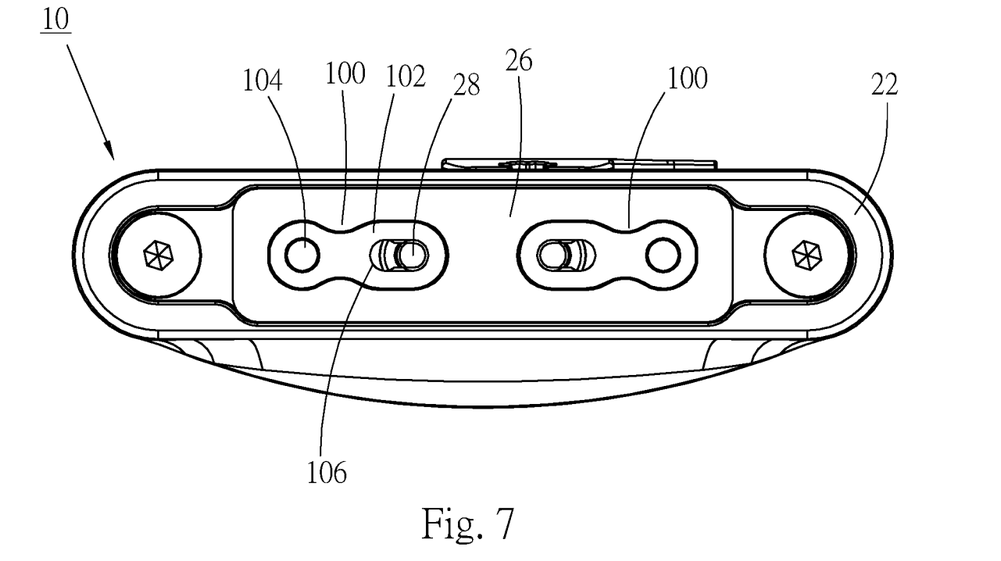
FIG. 7 is a left view according to FIG. 1, showing that the chain connectors are received in the foldable tool kit.

Please now refer to FIGS. 5 and 7. In this embodiment, the foldable tool kit 10 includes two chain connectors 100. A pin 104 and a latch hole 106 are respectively disposed at two ends of the chain plate 102 of each chain connector 100. The two chain connectors 100 are received in the second chamber 26 of the second side board 22. The pin 104 of one end of each chain connector 100 can be separably inserted into an insertion hole 27 as shown in FIG. 9. The latch hole 106 of the other end can be separably fitted with a latch boss 28 as shown in FIG. 7. Accordingly, the two chain connectors 100 can be securely located in the second chamber 26. The chain connectors 100 are relatively small components so that it often takes place that the chain connectors 100 drop or miss due to the random placing of a user. In this case, the user can hardly find the chain connectors 100 when assembling the components. However, in the invention, the chain connectors 100 can be received in the tool kit 10 to enhance the diversity and convenience of the tool kit 10 and it is easy for a user to find and use and receive the chain connectors.

Figure 1:
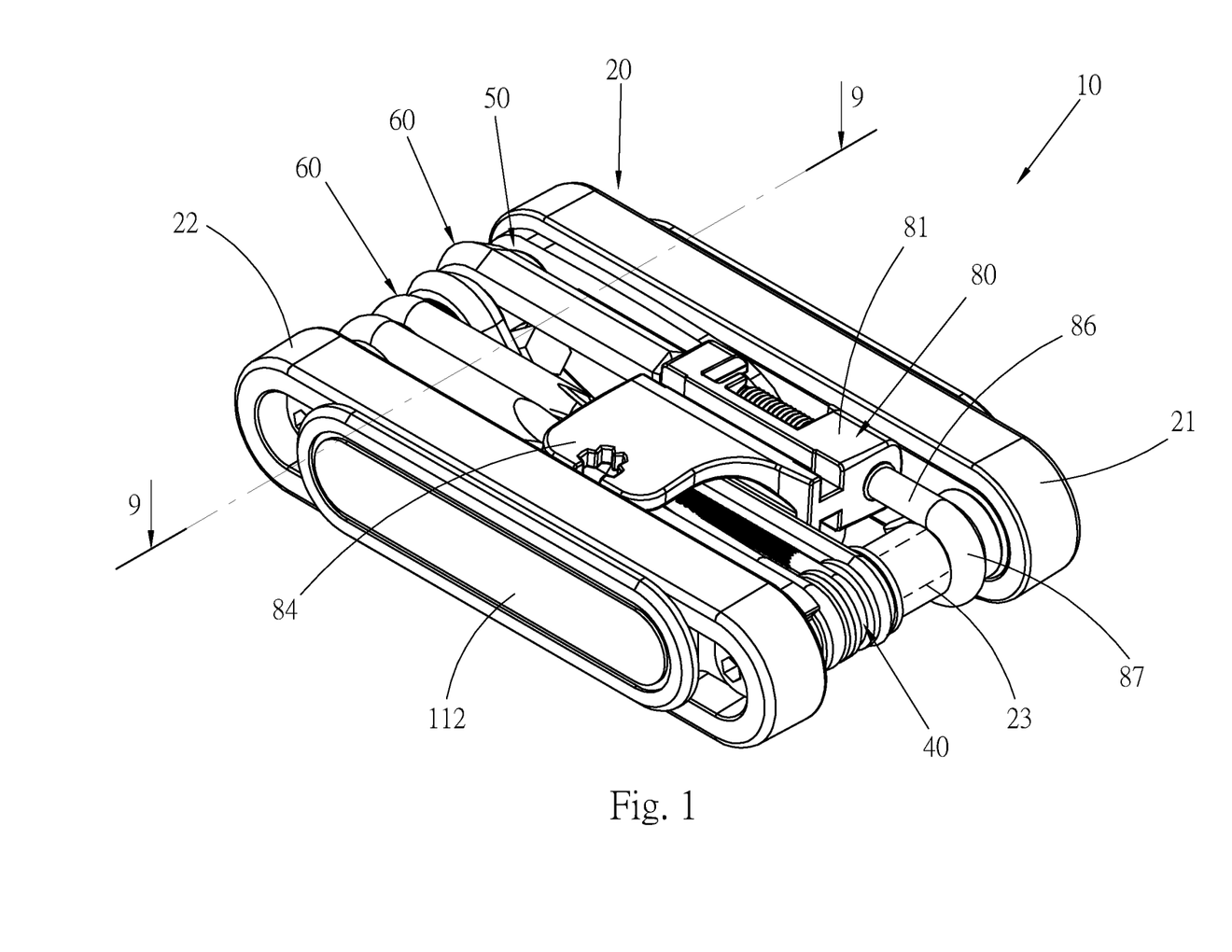
FIG. 1 is a perspective view of a first embodiment of the foldable tool kit of the present invention.
Figure 2:
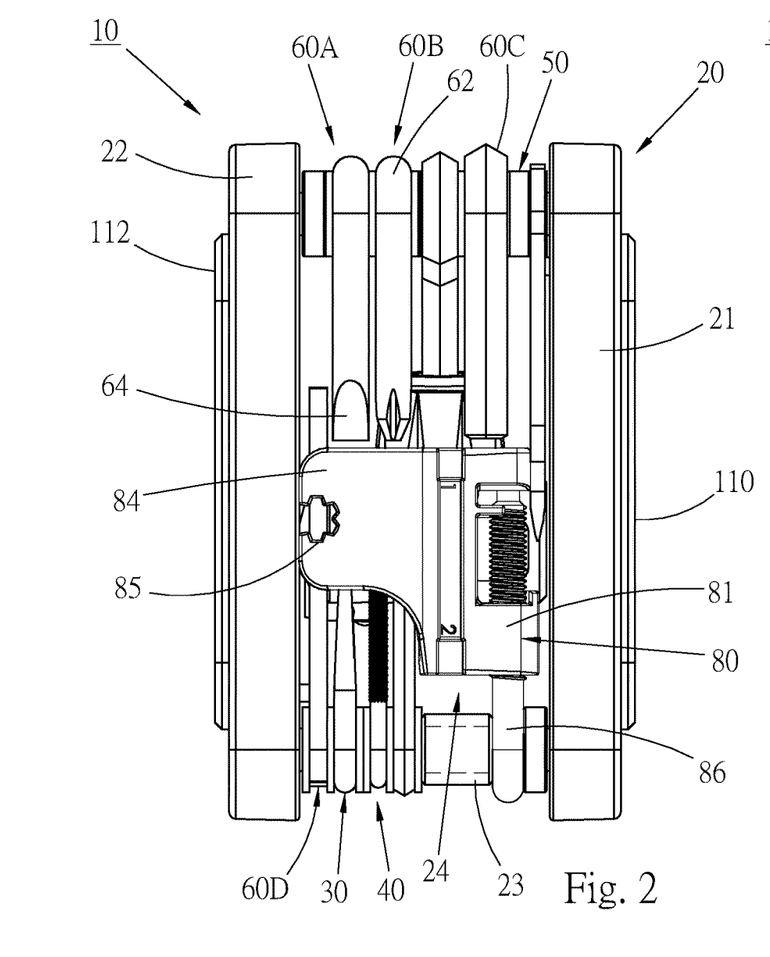
FIG. 2 is a top view according to FIG. 1.
Figure 3:
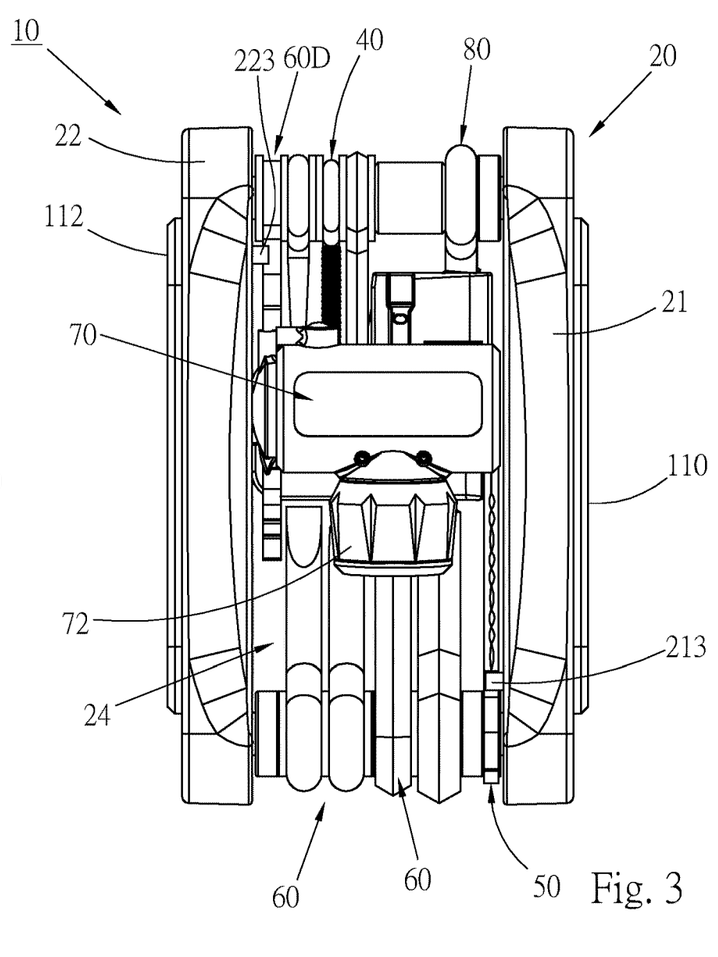
FIG. 3 is a bottom view according to FIG. 1.

Please now refer to FIGS. 1, 5 and 9. A first outer cover 110 is detachably disposed on the outer wall face of the first sideboard 21 to cover the first chamber 25, whereby the two tire reparation members 90 are prevented from dropping out of the first chamber 25. A second outer cover 112 is detachably disposed on the outer wall face of the second side board 22 to cover the second chamber 26, whereby the two chain connectors 100 further are prevented from dropping out of the second chamber 26.

In use of the foldable tool kit 10 of the present invention, the foldable tools 60 can be used to adjust and repair the components of the bicycle, such as the bicycle frame, the flywheel, the transmission and the spokes. In case of insufficient air pressure, the valve connector 70 can be connected with the high-pressure air steel cylinder to inflate the tire. The chain breaker tool 80 enables a user to adjust and repair the chain of the bicycle. In case of damage of the chain, the second outer cover 112 can be opened to take out the two chain connectors 100 from the second chamber 26 to replace the damaged parts.

In case that the tire of the bicycle is punctured, the foldable tool kit 10 of the present invention can be used to repair the tire. A user can remove the first outer cover 100 to take out a tire reparation member 90, that is, the tire reparation strip. Then, the tire reparation strip 90 is chucked by the chuck section 34 of the chuck 30 and inserted into the puncture of the tire. Then, the blade 50 is used to cut off the residual part of the tire reparation strip that protrudes from the tire face. Finally, the grinding section 44 of the grinding tool 40 is used to grind the cut off tire reparation strip 90 so as to make the tire reparation strip 90 flush with the surface of the repaired tire. Accordingly, the tire reparation process is completed. Thereafter, the tire is inflated with the high-pressure air steel cylinder and the valve connector 70 to enable the user to ride the bicycle again.

Figure 10:
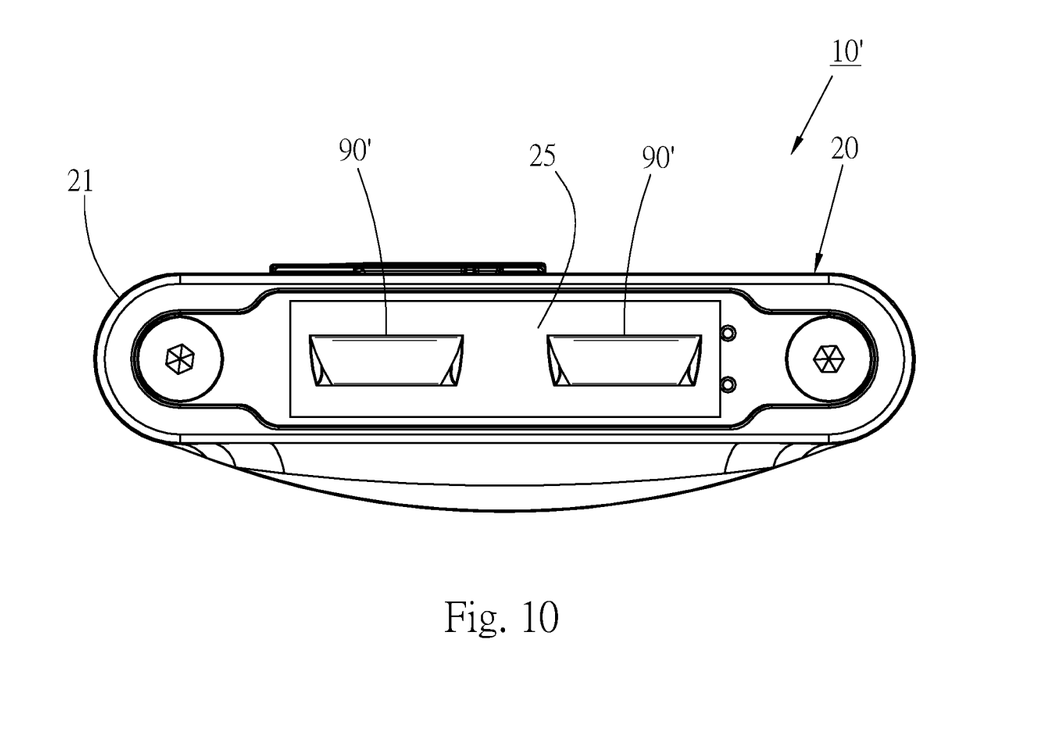
FIG. 10 is a side view of a second embodiment of the present invention.

Please now refer to FIG. 10, which is a side view of a second embodiment of the foldable tool kit 10' of the present invention, showing that the first chamber 25 of the first side board 21 is not covered by the first outer cover. The structure of the second embodiment is identical to that of the first embodiment and the same components are denoted with the same reference numerals. The second embodiment is different from the first embodiment in that the tire reparation members 90' are two tire reparation patches received in the first chamber 25. In use, the two tire reparation patches are taken out from the first chamber. The tire is repaired in such a manner that the punctured section of the inner tire is ground by the grinding section 44 of the grinding tool 40. Then the two tire reparation patches 90' are adhered to the punctured section. In this embodiment, the two tire reparation patches themselves have adhesion so that it is unnecessary to additionally paint adhesive onto the two tire reparation patches for adhering the two tire reparation patches on the inner tire. The two tire reparation patches 90' are applicable to the bicycle tire with an inner tire. The tire reparation strips 90 of the first embodiment are applicable to the bicycle tire without inner tire. Accordingly, no matter whether the bicycle tire has an inner tire or not, the tool kit 10 of the present invention can be used to repair the tire and thus greatly benefit the bicycle rider.

The foldable tool kit of the present invention has the reparation and use function of the conventional tool kit. In addition, the foldable tool kit of the present invention collectively includes all the tire reparation tools and articles. Accordingly, when a bicycle rider rides a bicycle and encounters the problem of tire puncture and needs to repair the tire, the bicycle rider himself/herself can fully repair and service the tire of the bicycle. Therefore, although the foldable tool kit of the present invention is tiny, it includes all the necessary reparation tools for the bicycle. The diversity, convenience and utility of the foldable tool kit 10 of the present invention are enhanced.

The above embodiments are only used to illustrate the present invention, not intended to limit the scope thereof. Many modifications of the above embodiments can be made without departing from the spirit of the present invention.

What is claimed is:

1. A foldable tool kit with tire reparation function, comprising:
 a main body having a first side board and a second side board spaced from each other, the two side boards defining therebetween a receiving space; a first chamber being formed in the first side board;
 multiple tools including a grinding tool, a chuck and a blade, one end of the tools being pivotally connected with the main body and rotatable into the receiving space or out of the receiving space;
 the other end of the chuck having a chuck section;
 a grinding section being disposed on the grinding tool; and
 at least one tire reparation member received in the first chamber.

2. The foldable tool kit as claimed in claim 1, wherein the grinding tool has the form of a rod or a bar and the grinding section is disposed on a circumference of the grinding tool.

3. The foldable tool kit as claimed in claim 1, wherein the chuck section of the chuck has two chucking plates, the two chucking plates being elastically expandable; a chucking split being defined between the two chucking plates.

4. The foldable tool kit as claimed in claim 1, further comprising a second chamber formed in the second side board; at least one bicycle component being received in the second chamber.

5. The foldable tool kit as claimed in claim 4, wherein at least one insertion hole is formed on an inner wall face of the second chamber; the at least one bicycle component being at least one chain connector, the chain connector having a chain plate and a pin and a latch hole disposed on the chain plate, the pin of the chain connector being separably inserted in an insertion hole.

6. The foldable tool kit as claimed in claim 5 wherein at least one latch boss is disposed on the inner wall of the second chamber; the latch hole of the chain connector being separably fitted with the latch boss.

7. The foldable tool kit as claimed in claim 4, wherein the opening of the second chamber is positioned on the outer wall face of the second side board; the foldable tool kit further comprising a second outer cover, which is openably disposed on the opening of the second chamber to cover the second chamber.

8. The foldable tool kit as claimed in claim 1, wherein the tire reparation member is a tire reparation strip or a tire reparation patch.

9. The foldable tool kit as claimed in claim 1, wherein the opening of the first chamber is positioned on the outer wall face of the first side board; the foldable tool kit further comprising a first outer cover, which is openably disposed on the opening of the first chamber to cover the first chamber.

10. The foldable tool kit as claimed in claim 1, further comprising a valve connector, the valve connector having a first valve adaptation section and a second valve adaptation section, the first valve adaptation section of the valve connector being separably fitted and connected with one end of one of said tools.

11. The foldable tool kit as claimed in claim 1, further comprising a chain breaker tool having a chain breaker main body and a push rod, a chain breaking space being disposed on the chain breaker main body; one end of the push rod being screwed in a threaded hole formed on one side of the chain breaker main body and able to be screwed into or out of the chain breaking space; a holding section being disposed on the chain breaker main body; the other end of the push rod being pivotally disposed at one end of the main body and rotatable.

12. A foldable tool kit with tire reparation function, comprising:
a main body having a first side board and a second side board spaced from each other, the two sideboards defining therebetween a receiving space; a second chamber being formed in the second side board;
multiple tools including a grinding tool, a chuck and a blade, one end of the tools being pivotally connected with at least one end of the main body and rotatable into the receiving space or out of the receiving space;
the other end of the chuck having a chuck section;
a grinding section being disposed on the grinding tool;
at least one tire reparation member received in the main body; and
at least one bicycle component received in the second chamber.

13. The foldable tool kit as claimed in claim 12, wherein the grinding tool has the form of a rod or a bar and the grinding section is disposed on a circumference of the grinding tool.

14. The foldable tool kit as claimed in claim 12, wherein the chuck section of the chuck has two chucking plates, the two chucking plates being elastically expandable; a chucking split being defined between the two chucking plates.

15. The foldable tool kit as claimed in claim 12, wherein the tire reparation member is a tire reparation strip or a tire reparation patch.

16. The foldable tool kit as claimed in claim 12, wherein at least one insertion hole is formed on an inner wall face of the second chamber; the at least one bicycle component being at least one chain connector, the chain connector having a chain plate and a pin and a latch hole disposed on the chain plate, the pin of the chain connector being separably inserted in an insertion hole.

17. The foldable tool kit as claimed in claim 16, wherein at least one latch boss is disposed on the inner wall of the second chamber; the latch hole of the chain connector being separably fitted with the latch boss.

18. The foldable tool kit as claimed in claim 12, wherein the opening of the second chamber is positioned on the outer wall face of the second side board; the foldable tool kit further comprising a second outer cover, which is openably disposed on the opening of the second chamber to cover the second chamber.

19. The foldable tool kit as claimed in claim 12, further comprising a valve connector, the valve connector having a first valve adaptation section and a second valve adaptation section, the first valve adaptation section of the valve connector being separably fitted and connected with one end of one of said tools.

20. The foldable tool kit as claimed in claim 12, further comprising a chain breaker tool having a chain breaker main body and a push rod, a chain breaking space being disposed on the chain breaker main body; one end of the push rod being screwed in a threaded hole formed on one side of the chain breaker main body and able to be screwed into or out of the chain breaking space; a holding section being disposed on the chain breaker main body; the other end of the push rod being pivotally disposed at one end of the main body and rotatable.

* * * * *